Nov. 11, 1930. D. H. BELLAMORE 1,780,897
DISK WHEEL
Filed March 24, 1927 2 Sheets-Sheet 1
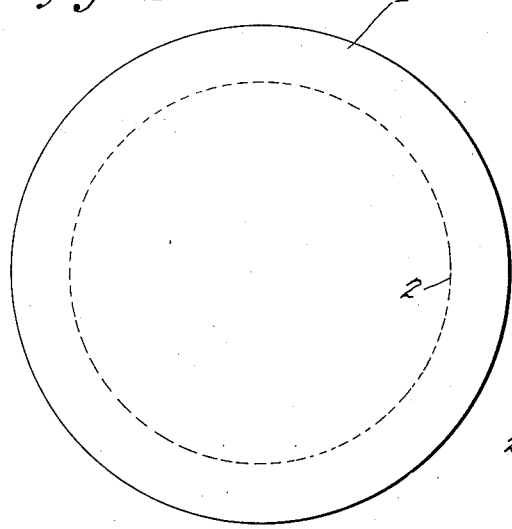
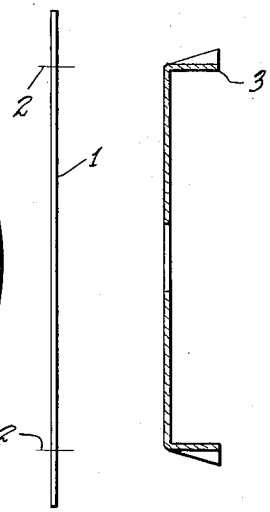
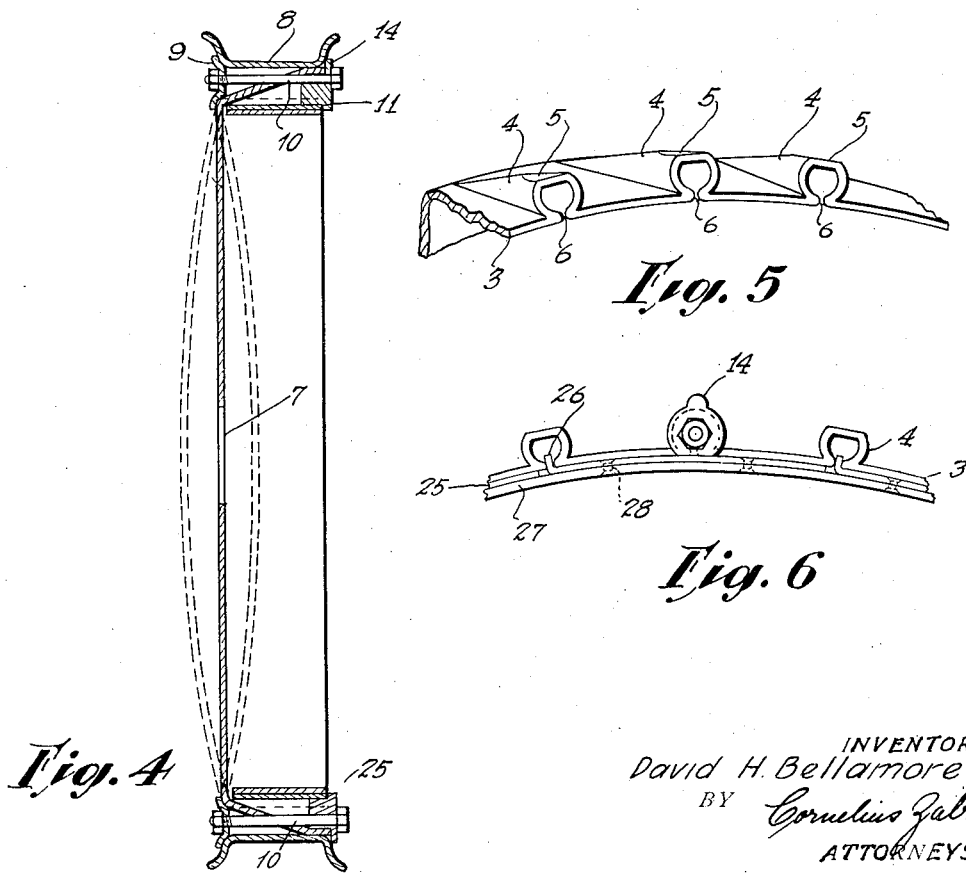
INVENTOR.
David H. Bellamore
BY Cornelius Zabriskie
ATTORNEYS.

Nov. 11, 1930.  D. H. BELLAMORE  1,780,897
DISK WHEEL
Filed March 24, 1927   2 Sheets-Sheet 2
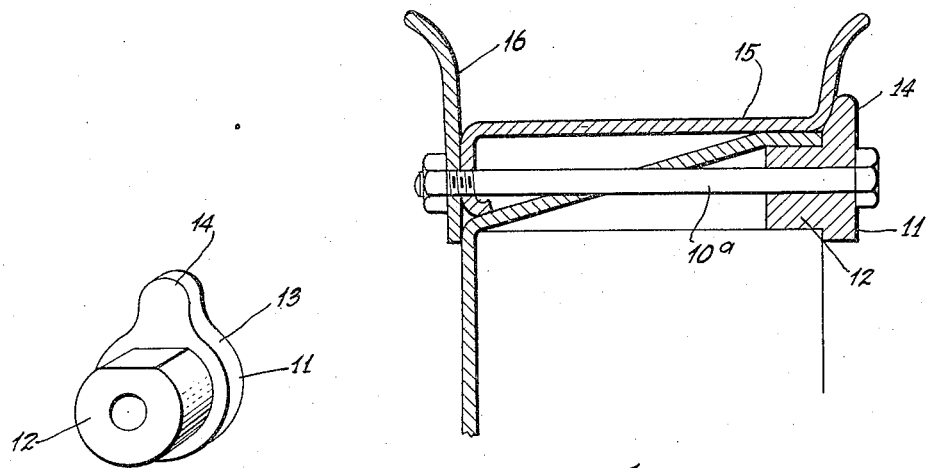
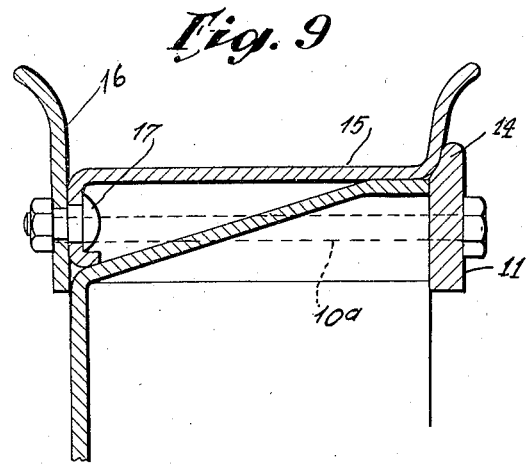
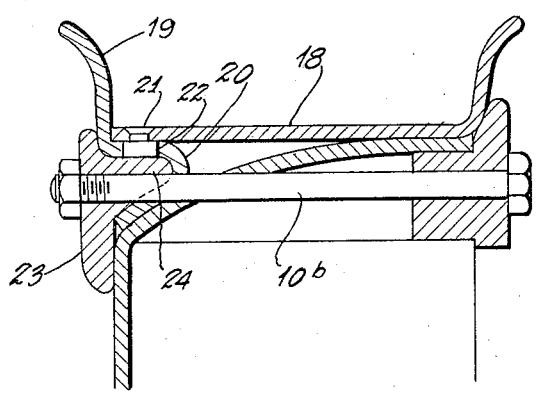
INVENTOR.
David H. Bellamore
BY
ATTORNEYS.

Patented Nov. 11, 1930

1,780,897

UNITED STATES PATENT OFFICE

DAVID H. BELLAMORE, OF NEW YORK, N. Y.

DISK WHEEL

Application filed March 24, 1927. Serial No. 177,935.

This invention relates to disk wheels, as well as to the method of making such wheels, and the invention is directed more particularly to simplification in wheel construction, the minimizing of parts, and the production of thoroughly efficient disk wheels of maximum simplicity.

In the making of disk wheels, as now practised, a brake drum may be associated with the wheel either by making the wheel independent of the brake drum and securing the drum thereto by rivets, bolts or otherwise, or by mounting the brake drum upon the hub and supporting the disk from the drum.

The present invention is a marked departure from both of the constructions referred to, and, generally speaking, consists in the formation of the wheel in such manner that the disk and drum elements of the wheel are one and the same element. That is to say, it is the purpose of this invention to provide an element provided with a substantially annular part, the inner periphery of which constitutes the operative brake drum surface and on the outer periphery of which the tire is mounted. By this construction, there is no separate, independent disk element, the tire being mounted, figuratively speaking, directly upon the brake drum. This is eminently practical for present day practice in automobile wheel construction because of the increasing tendency to make the brake drum relatively large and the rim and tire of the wheel relatively small in diameter.

The elimination of the disk element from wheel construction presents numerous problems, important among which is the properties of metals to expand and contract under changes in temperature. It is well recognized that in the braking of a car, the heat resulting from friction generated during this operation, materially affects the associated metal parts in that it causes a marked expansion of such parts as the heat of friction increases and a corresponding contraction thereof as the heat dies away or is dissipated by radiation. For this reason, care must be exercised in the design of a wheel wherein the rim is directly mounted upon the outer periphery of the brake drum and the structure should be such that the expansion and contraction to which I have referred will not materially change the exterior diameter of the drum. I am aware that the expansion and contraction to which attention is directed may be compensated for in various ways, and the invention is not limited to the preferred practical form, which I will hereinafter more fully set forth. However, I have conceived a method and structure whereby the heat of friction will in no wise affect either the inner or outer peripheral diameter of a brake drum.

In the preferred manner of manufacturing the wheel of this invention, a substantially circular blank is manipulated in dies to form at its outer periphery a substantially annular flange, and during the manipulation of this blank, the material which constitutes the flange thereof is so disposed as to crimp or corrugate the flange portion in a direction longitudinally of the axis of the blank and in such manner that the resulting beads or corrugations will be positioned on the exterior face of the flange leaving the inner periphery thereof in the form of a substantially continuous uninterrupted cylindrical surface well adapted for braking purposes.

In the lateral folding or flanging operation, the beads to which I have referred are of tapering configuration and this is preferred, since this mode of manipulation provides for an efficient distribution of the metal without undue drawing or weakening of the metal at any part. Moreover, the peripheral beads or corrugations form a thoroughly practical and efficient seat for the tire of the wheel which is preferably carried by a rim which, in practice, may be permanently or demountably supported on the outer periphery of said flange.

The corrugations or beads on the exterior of the flange serve to space the tire a sufficient distance from the actual braking surface of the construction to eliminate the direct transmission of the heat of friction to the tire, and vice versa, to allow of efficient radiation of such heat so that it will not be communicated to the tire. The rim demountable, either in whole or in part, as may be desired, may be readily secured to the flange by suitable bolts which provide for the easy removal of the tire.

Fundamentally, the invention consists in providing a vehicle wheel having a brake drum which will be susceptible of the automatic compensation of circumferential expansion and contraction, due particularly to changes in the heat of friction accompanying braking, without material variation in diameter and to so construct such drum that a tire rim may be supported on and carried thereby. So far as I am aware, this has never been before suggested. Never before has a vehicle wheel been provided wherein the heat of friction accompanying braking will not have the effect of changing the diameter of the brake drum. It has long been the universal practice to make brake drums of vehicle wheels in such manner that they expand and contract under variations in temperature and correspondingly increase or diminish the effective operation of the brakes. This has been well recognized by those skilled in the art, but there has been hitherto no satisfactory solution of the problem. The present invention is based on a generic conception of a solution of such problem. However, from a more specific standpoint, the invention resides in the method of manipulating a blank of metal to form a disk wheel, in a manner hereinafter described, and, in the preferred practical forms of the invention which I have disclosed in the accompanying drawings.

I have also conceived a novel arrangement of braking means consisting more particularly in the mounting of brake lining upon the wheel instead of upon the brake bands or expansible braking elements as heretofore universally practised. Thus, the mounting of a brake lining upon a wheel also constitutes a part of this invention.

Features of the invention, other than those specified, will be apparent from the hereinafter detailed description and claims, when read in conjunction with the accompanying drawings.

The accompanying drawings illustrate different practical embodiments of the invention, but the constructions therein shown are to be understood as illustrative, only, and not as defining the limits of the invention.

Figure 1 is a face view of a sheet metal blank embodying the present invention.

Figure 2 is an edge view of the blank shown in Figure 1.

Figure 3 is a section showing the blank after being manipulated in dies, and formed into substantially finished shape.

Figure 4 is a diametric section through the wheel embodying the present invention.

Figure 5 is a fragmentary perspective view of a portion of a blank as illustrated in Figure 3.

Figure 6 is a fragmentary side elevation of the assembled structure as illustrated in Figure 4.

Figure 7 is a perspective view of one bolt plug which I may employ in connection with the wheel of the present invention.

Figures 8 and 9 show, in section, a modified form of wheel construction differing from the previous figures particularly in the manner of mounting the tire upon the disk-drum element.

Figure 10 is a radial section of a further modified form of construction.

Referring to the drawings, 1 designates a metal blank shown in Figs. 1 and 2. After the sheet metal has been blanked out, as illustrated in these figures, to form the blank shown therein, this blank is manipulated in dies to laterally deflect the marginal portion of the blank, i. e., to bend the blank along the line 2 in order that said blank may be provided with a marginal annular flange 3. The flange forming operation may be accomplished by dies manipulating the blank by one or more successive operations. I do not limit the method of this invention specifically in this respect, but, when the blank is manipulated to produce the construction of Fig. 3, the excess metal resulting from this operation is bent up or corrugated outwardly at intervals to form tapering beads 4, shown best in Figure 5 of the drawings.

Although it is not essential in the carrying out of this method, I preferably form each of these beads with a flanged seat or saddle 5, the purpose of which will be hereinafter more fully explained. At the conclusion of the flanging operation, the disk will appear as shown in Figs. 3 and 5, from which it will be noted that the inner periphery of the flange will be in the form of a substantially uninterrupted cylindrical surface, but around the periphery of this surface will be circumferentially spaced slots 6 where the folded portions of the metal substantially come together. It is desirable, however, that these slots be not entirely closed, but, rather, in the finished wheel, be slightly open, so that if the flange is heated by friction of a braking operation, or otherwise, the expansion or contraction of the metal will be compensated for by the presence of these slots which will open and close as the metal contracts and expands without varying either the inner or outer peripheral diameters of the structure. In other words, the expansion or contraction of the flange will merely serve to effect an opening or closing of the slots to which I have referred and will not vary the radial dimension of the flange.

During the manipulation of the blank, that portion of the blank bordered by the line 2 in Fig. 1 may be left flat or may be manipulated by dies, or otherwise, to render it convex or concave, as shown in dotted lines in Fig. 4, or to impart to the radial section of the blank any suitable contour that may be desired. The blank is of course provided at its center with an opening 7 to fit over any conventional form of hub.

A tire may be associated with the wheel of this invention in various ways, different illustrative forms of which I have shown in Figs. 4, 6, 8, 9 and 10. In the construction of Figs. 4 and 6, the demountable rim 8 which carries the tire is adapted to be slipped over the flange 3 to come to a seat on the saddles 5. The inclination of the tapering beads 4 will efficiently guide the demountable rim 8 into proper relation with these saddles, which will underlie one lateral portion of the rim and form seats therefor at relatively closely spaced distances about the wheel. The other lateral portion of the rim is adapted to be supported by a detachable ring 9, which may be conveniently held in position by means of bolts 10. These bolts extend through plugs 11, one of which is shown in detail in Figure 7, and through openings in the beads 4 and the ring 9 to receive nuts 11 at their outer ends. The form of plug illustrated in Fig. 7 is particularly appropriate for use with the preferred form of wheel illustrated in these drawings. It has a projecting portion 12 adapted to fit into the open end of the bead, and a flange 13 adapted to overlie the end of the bead and project upwardly a sufficient distance, as shown at 14 to engage with the flange of the rim 8, as shown in Figure 4.

When the parts are assembled, as illustrated in this latter figure, and the nuts 11 screwed up tight, the demountable rim 8 will be firmly clamped upon the flange 3 of the wheel without lost motion and against shifting. Driving lugs, not shown, may be formed on the inner periphery of the demountable rim to enter between beads 4 and to engage said beads so as to preclude relative rotation between the rim and wheel.

In practice, the ring 9 is preferably shaped to underlie a portion of the rim 8 so as to form a seat for said rim and to also overlie a portion of the flange 3, so as to seat firmly upon said flange in order to properly withstand radial compression incident to working conditions of the wheel. When the ring 9 is formed as shown, the tightening of the nuts will cause the ring 9 to exert a wedging action between the flange 3 and the rim and thus take up all lost motion.

The structure of Figures 8 and 9 is identical with the construction of the preceding figures in so far as the formation of the wheel and differs therefrom only in the manner of attaching the tire. Thus, in these figures, a different form of rim is illustrated. The purpose of these figures is merely to show a different rim construction. Thus, in Figures 8 and 9, a rim is shown in two parts 15 and 16. The part 15 extends over the greater portion of the width of the flange 3, embracing said flange and bearing upon the saddles 5. The part 16 is detachable from the section 15, and is in the form of a ring, the purpose of which is to maintain the tire on the part 15. Short bolts 17 secure the section 16 to the section 15, while interspaced, annularly arranged bolts 10$^a$, corresponding in function to the bolts 10 and similarly formed and positioned, serve to secure the rim to the disk-brake portions.

Figure 10 shows a highly novel form of rim construction, forming part of this invention. In Fig. 10, the rim embodies sections 18 and 19, the former of which seats on the saddles 5, and the latter of which is in the form of a split ring, i. e., a ring parted at some point in its circumference, and having formed thereon a bead 20 adapted to overlie a marginal portion of the interior periphery of the section 18. The section 18 carries circumferentially spaced apart pins 21, while the bead 20 has similarly placed perforations 22. The ring 19 is adapted to be sprung into and out of engagement with the pins 21 of the rim section 18 when changing the tire, and the assembled rim sections are adapted to be secured to the wheel by means of bolts 10$^b$ of the same construction and function in the same manner as the bolts 10 and 10$^a$. Associated with this construction, however, is a ring or series of lugs 23 which have an annular projection or spaced projections 24 adapted to fit into the bead 20 of the section 19 when the parts are assembled in order to lock the split section 19 against inadvertent disengagement from the pins 21.

A wheel constructed in the manner described may be associated with any conventional form of hub and may be bolted or otherwise secured thereto as may be desired. Moreover the inner cylindrical surface of the flange 3 which constitutes the braking surface of the brake drum, may cooperate with any suitable conventional form of brake mechanism, which, when operated, will function in a conventional way to brake the wheel.

It is to be noted, however, that the heat generated by the braking operation, will have no effect upon the diametrical dimension of the flange 3 for the reason that any expansion or contraction which the metal may undergo will be compensated for by the slots 6 to which I have referred. Moreover, the beads space the rim a sufficient distance from the actual braking surface to preclude direct transmission of the heat of friction to the tire and the relatively open spacing provided by these beads permits of the circulation of air in a manner to effect maximum radiation of the generated heat.

I wish it understood, however, that instead of employing plugs, such as shown in Fig. 7, which will leave the spaces between the respective beads open for the free circulation of air, I may, without departing from this invention employ a continuous annular ring in place of these plugs, so as to close in the space between the inner periphery of the flange and the rim in order to preclude entrance of foreign matter, such as dirt or snow into the space between the beads 4.

In the wheel of this invention, the tire nipple may be L shaped and carried out through the ring 9, or equivalent parts between adjacent beads 4, as will be apparent to those skilled in the art.

I have thus far described a wheel which may be used interchangeably as a front or rear wheel on four wheel brake cars, or as a front or rear wheel on two wheel brake cars. The wheel has been described as provided with a flange 3 the inner periphery of which constitutes a braking surface. This is the normal manner of employing the wheel of this invention. In thus operating the wheel, expanding brake mechanism is employed, and the brake lining may be mounted on and carried by the expansible braking elements.

I have found, however, that it is highly practical to mount brake lining upon the flange 3, instead of upon the expansible brake elements. The lining may be secured directly to the inner periphery of the flange 3, but a better and more convenient construction is to provide a liner ring 25 adapted to have a fairly tight fit within the flange 3, as shown in Figs. 4 and 6 and having upward radial projections 26 adapted to enter the slots 6, so as to lock the liner ring against rotation relative to the flange. The brake lining 27 may be secured to the liner ring by means of rivets 28 or otherwise.

This provides a very simple and convenient arrangement for the reason that when it is desired to reline brakes, it is only necessary to remove the wheel, withdraw the liner 25 and attach new lining. Obviously, this is a much simpler operation and far more convenient than the relining of expansible brake elements which, in many instances, necessitates a dismantling of operative parts of the car. In order to reline brakes in the manner which I have described, the brake bands may be made accessible by the same operations as would be ordinarily practised in merely changing a wheel. The practical importance of this phase of the invention will be apparent.

The wheel of this invention is not limited to the particular manner of braking the wheel, as the braking operation may be carried out in one way or the other. I wish it understood, however, that the mounting of a brake lining upon the drum of the wheel constitutes a part of this invention.

Having thus described my invention, what I claim as new and desire to secure by Letters Patent is:

1. A disk wheel embodying a disk portion provided at its outer periphery with a laterally extending circumferentially corrugated flange constituting both the brake drum and the felly of the wheel.

2. A disk wheel embodying a disk portion provided at its outer periphery with a laterally extending circumferentially corrugated flange constituting both the brake drum and the felly of the wheel, and the inner periphery of which flange is of substantially cylindrical form and comprises a succession of annularly disposed arcuate surfaces circumferentially spaced from one another.

3. A disk wheel embodying a disk portion provided at its outer periphery with a laterally extending flange, the inner surface of which is in the form of annularly disposed circumferentially spaced apart arcuate sections collectively constituting a circumferentially divided substantially cylindrical braking surface and the exterior of which flange forms a seat for a tire rim.

4. A disk wheel embodying a disk portion provided at its outer periphery with a laterally extending flange, the inner surface of which is in the form of annularly disposed circumferentially spaced apart arcuate sections collectively constituting a cylindrical braking surface, means for connecting contiguous edges of adjacent arcuate sections for relative circumferential adjustment without change in diameter of the flange, and a tire rim embracing said flange and supported thereon.

5. A disk wheel embodying a disk portion provided at its outer periphery with a laterally extending flange, the inner surface of which is in the form of annularly disposed circumferentially spaced apart arcuate sections collectively constituting a cylindrical braking surface, and the exterior of which flange is provided with transversely extending hollow ribs forming connections between the contiguous edges of adjacent arcuate sections to permit their relative circumferential adjustment while maintaining the diameter of the flange constant, in combination with a tire rim embracing and seated upon said hollow ribs, bolts extending longitudinally through said ribs, and means coacting with the bolts to detachably hold the rim in position.

6. A disk wheel embodying a brake drum, and a tire rim mounted on the brake drum, said drum being provided with transversely extending open plaits to render the drum circumferentially adjustable without variation in its diameter.

7. A disk wheel embodying a brake drum, and a tire rim mounted on the brake drum, said drum being provided with transversely extending tapering box plaits to render the drum circumferentially adjustable without variation in its diameter.

8. A disk wheel embodying a brake drum the braking flange of which is transversely corrugated to render the drum circumferentially adjustable without variation in its diameter, and bolts extending through the corrugations of the flange to secure a tire rim upon the flange.

9. A disk wheel embodying an annular member comprising spaced apart arcuate sections, the contiguous edges of which are yieldably secured together and the inner faces of which constitute braking surfaces, whereby said annular member is adapted for circumferential expansion and contraction under varying changes in temperature due to braking without effecting appreciable variation in diameter of said member, and a tire rim supported on and in coaxial relation to the annular member.

10. A disk wheel having a brake drum comprising a succession of relatively adjustable arcuate sections whereby said sections are adapted to individually circumferentially expand and contract under variations in temperature without appreciable change in their radius, and a tire rim, said drum forming a support for said rim.

In testimony whereof I have signed the foregoing specification.

DAVID H. BELLAMORE.